H. P. RENNER.
NUT LOCK.
APPLICATION FILED JAN. 22, 1914.
1,166,259.
Patented Dec. 28, 1915.
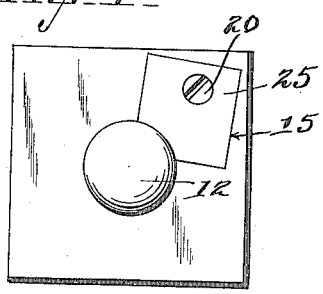
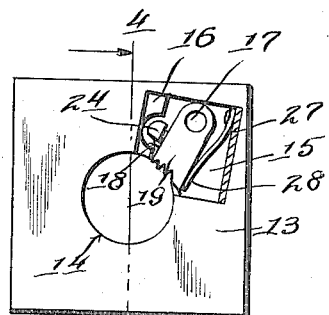
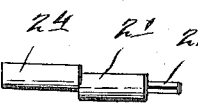
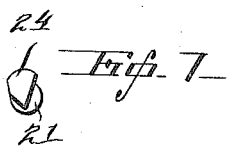
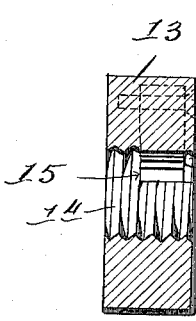
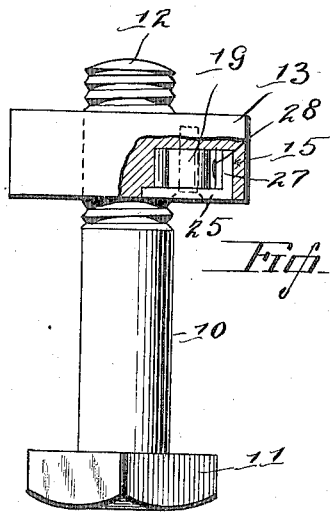
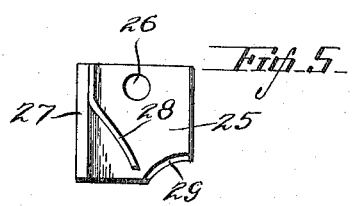
Witnesses
E. S. Hall
Ross J. Woodward
Inventor
Henry P. Renner,
Richard Renner,
his Attorney
By
COLUMBIA PLANOGRAPH CO., WASHINGTON, D. C.

UNITED STATES PATENT OFFICE.

HENRY P. RENNER, OF WAYNESBURG, PENNSYLVANIA.

NUT-LOCK.

1,166,259.              Specification of Letters Patent.        Patented Dec. 28, 1915.

Application filed January 22, 1914. Serial No. 813,783.

*To all whom it may concern:*

Be it known that I, HENRY P. RENNER, a citizen of the United States, residing at Waynesburg, in the county of Greene and State of Pennsylvania, have invented certain new and useful Improvements in Nut-Locks, of which the following is a specification.

This invention relates to a nut lock and the principal object of the invention is to provide a nut lock in which the nut is provided with an improved type of locking pawl pivotally mounted in the nut in an improved manner and mounted in a housing so constructed that the housing will be completely inclosed when the nut is placed upon the bolt thus protecting the spring from dampness and dirt.

Another object of the invention is to provide an improved means for removing the pawl out of an operative position to permit the nut to be removed from the bolt.

Another object of the invention is to so construct the cap for the housing that it may be easily removed when desired in order to make necessary repairs to the locking means such as sharpening the gripping teeth of the pawl.

Another object of the invention is to so construct the cap, pawl, and releasing pin that all may be easily and quickly removed from the housing when desired.

This invention is illustrated in the accompanying drawings wherein—

Figure 1 is an end view of the nut and bolt; Fig. 2 is a plan view of the nut with the cap broken away; Fig. 3 is a side elevation of the nut and bolt with the nut broken away; Fig. 4 is a section taken along the line 4—4 of Fig. 2 with the cap in place; Fig. 5 is a bottom plan view of the cap; Fig. 6 is a side elevation of the pin which moves the pawl to an inoperative position; Fig. 7 is an end elevation of the pin shown in Fig. 6; Fig. 8 is a view of the key which engages the pin shown in Fig. 6.

The bolt 10 is provided with a head 11 and with a threaded end portion 12 upon which the nut 13 is placed. This bolt 10 is formed in the usual manner and it is noted that the bolt may be provided with any suitably shaped shank or head desired, the only requisite being that the outer end portion be threaded.

The nut 13 is provided with a threaded central opening 14 and with a cut-out portion forming a housing 15 which communicates with the threaded opening 14 and is provided at one side with a supporting ledge or shoulder 16 which supports one edge of the cover plate to be hereinafter described. In the bottom of the housing 15 there is provided a threaded socket 17 and also a passage way 18 in which the pawl-releasing pin is rotatably mounted. The bolt-engaging pawl 19 is placed in the housing and is pivotally mounted by means of a screw 20 which extends into the threaded socket formed in the bottom of the housing and serves to pivotally mount the pawl and releasably hold the cover of the housing in place. The releasing pin 21 is rotatably mounted in the passage way 18 and is provided at its outer end with a reduced shank 22 for engagement by the key 23 and has its inner end portion 24 cut to form an offset extension constituting a cam which will engage the side face of the pawl 19 when the pin is rotated by the key and move the pawl out of engagement with the threads of the bolt. The cover 25 is provided with an opening 26 through which the screw 20 passes and is provided at one side with a depending flange 27 which extends to the bottom of the pocket 15 and carries a leaf spring 28. This leaf spring 28 has its free end engaging the pawl 19 as shown at Fig. 2 to normally hold the pawl in the position shown in this figure so that when the nut is placed upon the bolt, the spring will hold the teeth of the pawl in engagement with the threads of the bolt and thus cause a binding which will prevent the nut from turning in the reverse direction after being tightened. The edge 29 of the cover plate 25 is threaded to form a continuation of the threads of the nut and it will thus be seen that when the nut is placed upon the bolt, the threads of the bolt by engaging the threaded edge 29 of the cover will assist in holding the cover in place.

When this device is in use, the locking means is assembled as shown in Figs. 2 and 3 and the nut is then threaded upon the bolt. As soon as the nut has been turned as tight as desired it can not move in the reverse direction since the pawl 19 engages the threads of the bolt and prevents turning in the reverse direction. If it is desired to remove the nut, the reduced extension 22 of the pin 21 is engaged by the key 23 and the pin is turned to bring the cam extension 24 into engagement with the pawl and thus move the pawl out of engagement with the bolt. The nut can then be easily removed. When the nut is placed upon the bolt, the bolt fills the inner opening of the housing 15 through which the pawl 19 projects and the cover 25 incloses the main opening of the housing and the pin or stem 21 fills the opening 18 formed in the bottom of the housing. It will thus be seen that when the nut is placed upon the bolt that the housing may be completely closed and therefore fine dirt can not enter the housing to fill the housing and interfere with the working of the locking device, and that water can not enter the housing to rust the spring and thus prevent the spring from working properly to hold the pawl in engagement with the threads of the bolt. This nut lock will therefore be water proof and dirt proof and therefore can not be damaged by water collecting in the hollows of the roadbed of a railroad or by fine dirt. If it is desired to sharpen the teeth of the pawl or to make any other necessary repairs of the nut lock, the screw 20 can be easily removed and the cover 25 can then be removed. When the cover is removed, the spring is, of course, carried with it thus leaving the pawl loose in the housing. This pawl can then be easily removed and repaired and then replaced. It will be noted from an inspection of Fig. 2 that when the pawl is in place, it extends across the body portion of the stem 21 and thus serves to prevent the stem from moving inwardly. If it is necessary to make the repairs to the stem, this stem can also be removed after the bottom has been removed.

I have thus provided a nut lock in which the locking means is mounted in a water and dust proof housing and in which the locking means can be easily removed if it is desired to repair the locking means. I have also provided a nut lock in which the nut will be securely held in a desired position upon the bolt but which is so constructed that the locking means may be easily released when it is desired to remove the nut. It should be noted that I have provided a nut lock in which the bolt assists in holding the cover in place by having its threads engaging the threaded edge of the cover.

What is claimed is:

A nut lock comprising a bolt having a threaded end portion, a nut screwed upon the threaded end portion of said bolt and provided with a cutout leading from its threaded opening and forming a housing, a pawl movably mounted in said housing, a cover for said housing provided with a wall extending into the same, resilient means carried by the wall of said cover and engaging said pawl to yieldably hold the same in an operative position, and means for moving said pawl out of an operative position.

In testimony whereof I affix my signature in presence of two witnesses.

HENRY P. RENNER.

Witnesses:
FRANK F. SUTTON,
JNO. T. GOODWIN.

Copies of this patent may be obtained for five cents each, by addressing the "Commissioner of Patents, Washington, D. C."